Patented Dec. 8, 1953

2,662,028

UNITED STATES PATENT OFFICE 2,662,028

MILL ADDITION AGENT FOR ENAMEL SLIPS

Walter M. Fenton, Minneapolis, Minn., assignor, by mesne assignments, to Lithium Corporation of America, Inc., Minneapolis, Minn., a corporation of Minnesota No Drawing. Application January 5, 1950, Serial No. 137,041

6 Claims. (Cl. 106—194)

My invention relates to improvements in the manufacture of silicious vitreous or porcelain enamel, hereinafter referred to simply as enamel, compositions and is especially concerned with mill addition agents for use in the manufacture of such enamel.

In both the dry and wet processes of enameling metals, a frit is initially prepared which, generally speaking, is made by melting silicious materials, such as quartz or feldspar or both, together with fluxes and metallic oxides and other agents such as, for example, borax, soda ash, fluorspar, cryolite, sodium nitrate, potassium nitrate, zinc oxide, nickel oxide, cobalt oxide, manganese oxides, lithium oxide, barium carbonate, titanium oxide, and the like. The resulting fused material, which forms a glass-like mass, is then run into a tank of cold water the result of which is to cause the molten glass-like mass to shatter into a large number of friable pieces of vitreous materials commonly called enamel frits. Frequently, the metallic oxides are introduced into the frit composition in the form of the carbonate salt, for example, lithium carbonate, which, under the high temperatures used in producing the frit and the final enamel coatings, breaks down to the oxide. In use, the frits are milled together with certain so-called mill additions, such as clays, feldspars, borax, magnesium carbonate, etc. and then applied to the metal base and subjected to elevated temperatures to cause the enamel composition to fuse and adhere to the metal base. Where the wet process is employed, the mill addition also includes water and the resulting enamel "slip," which comprises an aqueous suspension of the frit and certain of the mill addition agents, is applied to the metal base by dipping, spraying or slushing procedures.

It has been almost universal practice in the art to utilize clays as one of the mill addition agents and, at least in most instances, clays have been regarded as most essential if satisfactory enamels are to be produced. The clays function in a number of ways as, for example, as suspending or floating agents for the small particles of the milled frits and the like in water; as binders for holding the enamel particles in position after the enamel has been applied to the iron or steel ware and dried; and as a modifying agent with respect to the fusion temperature of the enamel, the physical properties of the enamel, and the opacity and color of the enamel.

Despite this essentially universal practice, the use of clays as mill addition agents has a number of marked disadvantages. Among the latter are an adverse effect on the color of titania opacified enamels, and a decrease in resistance to acid. Furthermore, the lack of uniformity of the different clays in itself introduces serious problems in commercial manufacturing operations.

It has also been proposed to utilize gums, notably gum arabic and gum tragacanth, as floating or suspending agents, in place of clays, or for the purpose of improving film strength. Such use is, at best, of only very limited character and, in general, even where such gums are employed, they are utilized in conjunction with clays. In any event, they, too, have a number of disadvantages in that they are subject to bacterial decomposition, and the enamel slips made therewith tend to become lumpy on standing.

I have discovered that significant improvements may be made in enamels by eliminating clays as mill addition agents and utilizing in place thereof mixtures of a carboxyalkyl cellulose and certain alkali, especially lithium, salts. The combination of the carboxyalkyl cellulose and said alkali salts, and especially the lithium salts, when used as a mill addition agent in place of clays, brings about a number of important advantages. In the first place, in the case of titania opacified enamels used as cover coats, there is a definite improvement in color. In the second place, there is, in many cases, a definite increase in resistance to attack by acid. A further advantage which has been noted resides in higher reflectance values in the finished enamel when measured against a similar enamel but made with a clay as a mill addition agent. Still other advantages are an increase in film strength in the bisque state; the ability to use increased amounts of water in the mill whereby to make thinner and smoother coatings, and wider burning ranges in the enamels with improvement of the quality of the finished enamels. It has also been found that, through the use of various of my novel mill addition agents, it is possible to control the shade of white color on titania opacified enamels simply by varying the firing temperature whereas, in the case of conventional enamels utilizing clays, reasonable variation in color must be achieved by the addition of color oxides or the like and certain salts in varying proportions. I have also found that not only may the use of clays be eliminated but, in addition, in many instances, it is also possible to eliminate the use of salts, oxides, etc. as mill addition agents so that, for many purposes, the mill addition may comprise solely water and the mixture of the carboxyalkyl cellulose and the alkali salt. With certain types of frits, it is occasionally advantageous to include in the mill, together with the frit, the alkali salt, for example, lithium titanate, the carboxyalkyl cellulose and water, small amounts of bentonite, proportions of the order of 1 to 4 ounces of bentonite per 100 pounds of frit generally being quite satisfactory. Substantially lesser amounts of urea, for example, 0.1 to 0.2 ounce of urea for 100 pounds of frit, when used in the spray or dip tank have also been found to be of value with respect to improvement of the "set" of the enamels.

The carboxyalkyl cellulose utilized should be one having good suspending or floating properties and should be soluble or easily dispersible in water, particularly at room temperatures or below. Carboxymethyl celluloses, carboxyethyl celluloses, and carboxypropyl celluloses, in the form of their water-soluble or dispersible salts, for example, their alkali metal, and particularly sodium, salts, or mixtures thereof, are most satisfactory. Especially satisfactory is the so-called heavy viscosity sodium carboxymethyl cellulose, identified in the trade as the "70H" type.

As I have stated above, certain alkali compounds, when used in conjunction with the carboxyalkyl celluloses, bring about the advantageous results described above. These alkali compounds are sodium titanate, potassium titanate, calcium titanate, lithium titanate, lithium zirconium silicate, sodium zirconium silicate, lithium manganite, lithium silicate, sodium silicate, lithium zirconate, sodium aluminate, lithium aluminate, and lithium cobaltite, as well as mixtures of any two or more. Especially suitable are lithium titanate and lithium zirconium silicate. When the term "salt of an alkali-forming metal" is used in the claims, it will be understood to mean the alkali metal and alkaline earth metal salts of the aforementioned acid radicals, as well as mixtures of any two or more. When the term "lithium salt" is used in the claims, it will be understood to mean one or more of the aforementioned lithium salts.

The ratio of proportions of the alkali, for example, lithium salt to the carboxyalkyl cellulose is variable but, in general, the said salt is present in proportions in excess of that of the carboxyalkyl cellulose, good results being obtained in the usual case with compositions in which the alkali salt is present in proportions approximately 2 to 4 times that of the carboxyalkyl cellulose. In the case of the manufacture of enamel cover coats, it is preferred to use compositions in which the ratio of proportions of the alkali salt to the carboxyalkyl cellulose is on the higher side, that is, from about 3 or 4 to 1; whereas, in the case of the manufacture of ground coat enamels, the lower ratios of proportions of alkali salt to carboxyalkyl cellulose are preferred, for example, 1.5 to 2 to 1.

In relation to the frit content used in the manufacture of the enamel, the proportions of the alkali salt and the carboxyalkyl cellulose are variable but, in all cases, are quite small. In general, good results are obtained where the alkali salt is present in proportions of about 0.5% to 2%, and the carboxyalkyl cellulose is present in proportions of about 0.1% to 0.6%, based on the weight of the frit.

My invention finds particular utility in the preparation of enamel cover coats for application to iron, for example, cast iron, or steel, for example, in the form of flatware such as sheets, or formed or fabricated ware known to the trade as "flatware." It is, however, useful also in the manufacture of enamel ground coats and cover coats for kitchen ware.

The following examples are illustrative of enamel compositions made in accordance with the present invention. It will be understood that various other frits may be employed and the proportions of the alkali salt and the carboxyalkyl cellulose used in the mill may be varied, within certain limits, without departing from the novel and useful principles disclosed herein.

*Example 1*

To 100 pounds of a commercial titania opacified frit,[1] made for use in cover coats, 42 pounds of water, and an intimate mixture containing 1 pound of lithium titanate and ¼ pound of sodium carboxymethyl cellulose (70–H) were added, in a ball mill, and ground for 14 hours to a fineness such that ½ gram remained on a 200 mesh screen using 100 cc. of the slip. The specific gravity of the enamel slip was 1.76. The slip was removed from the ball mill, mixed with water to reduce the specific gravity to 1.72, sprayed onto sheets of steel, and burned for 3.4 minutes at 1500 degrees F. A coating of excellent color and physical properties was obtained.

*Example 2*

To 100 pounds of a commercial zirconia opacified frit,[2] made for use in cover coats, 42 pounds of water, and an intimate mixture containing 1 pound of lithium zirconium silicate and ½ pound of sodium carboxymethyl cellulose (70–H) were added, in a ball mill, and ground for 14 hours to a fineness such that 1 gram remained on a 200 mesh screen using 100 cc. of the slip. The specific gravity of the enamel slip was 1.60. The slip was sprayed onto sheets of steel, and burned for 3 minutes at 1550 degrees F. A coating of excellent color and physical properties was obtained.

*Example 3*

To 100 pounds of a commercial antimony opacified frit,[3] made for use in cover coats, 42 pounds of water, and an intimate mixture containing 1 pound of lithium titanate and ½ pound of sodium carboxymethyl cellulose (70–H) were added, in a ball mill, and ground for 14 hours to a fineness such that 1½ grams remained on a 200 mesh screen using 100 cc. of the slip. The specific gravity of the enamel slip was 1.74. The slip was removed from the ball mill, mixed with water to reduce the specific gravity to 1.71, sprayed onto sheets of steel, and burned for 3 minutes at 1560 degrees F. A coating of excellent color and physical properties was obtained.

*Example 4*

To 100 pounds of a commercial titania opacified frit, made for use in cover coats, 42 pounds of water, and an intimate mixture containing 1 pound of potassium zirconate and ¼ pound of sodium carboxymethyl cellulose (70–H) were added, in a ball mill, and ground for 14 hours to a fineness such that ½ gram remained on a 200

---

[1] The frit was made from the following ingredients in parts by weight: Anhydrous borax 16, boric acid 3, titania 15, sodium nitrate 3, potassium nitrate 6, silica 49, and sodium silicofluoride 8.

[2] The frit was made from the following ingredients in parts by weight: Pyrophillite 30; anhydrous borax 20; quartz 12; sodium nitrate 2; soda ash 7; zirconia 15; fluorspar 6; calcium carbonate 5 and zinc oxide 3.

[3] The frit was made from the following ingredients in parts by weight: Feldspar 26; borax 26; quartz 20; soda ash 4.5; sodium nitrate 4.5; fluorspar 3.5; cryolite 12 and antimony oxide 3.

mesh screen using 100 cc. of the slip. The specific gravity of the enamel slip was 1.75. The slip was removed from the ball mill, mixed with water to reduce the specific gravity to 1.72, sprayed onto sheets of steel, and burned for 3 minutes at 1560 degrees F. A coating of excellent color and physical properties was obtained.

*Example 5*

To 100 pounds of a commercial frit, made for use in two-frit ground coats, 53 pounds of water, and an intimate mixture containing 1 pound of calcium titanate and ½ pound of sodium carboxymethyl cellulose (70–H) were added, in a ball mill, and ground for 15 hours to a fineness such that 1½ grams remained on a 200 mesh screen using 100 cc. of the slip. The slip was sprayed onto sheets of steel, and burned for 3 minutes at 1560 degrees F. A coating of excellent color and physical properties was obtained.

*Example 6*

To 100 pounds of a conventional frit,[4] made for use in ground coats, 48 pounds of water, and an intimate mixture containing 1 pound of sodium zirconate and ½ pound of sodium carboxymethyl cellulose (70–H) were added, in a ball mill, and ground for 14 hours to a fineness such that 2 grams remained on a 200 mesh screen using 100 cc. of the slip. The slip was sprayed onto sheets of steel, and burned for 3 minutes at 1560 degrees F. A coating of excellent color and physical properties was obtained.

*Example 7*

To 100 pounds of a conventional frit,[5] made for use in ground coats, 51 pounds of water, and an intimate mixture containing 1 pound of lithium zirconium silicate and $\frac{6}{10}$ pound of sodium carboxymethyl cellulose (70–H) were added, in a ball mill, and ground for 13 hours to a fineness such that 1½ grams remained on a 200 mesh screen using 100 cc. of the slip. The slip was sprayed onto sheets of steel, and burned for 3 minutes at 1560 degrees F. A coating of excellent color and physical properties was obtained.

While the invention has been described in detail, it is to be understood that the scope thereof is not to be limited other than is set forth in the claims.

What I claim as new and desire to protect by Letters Patent of the United States is:

1. A mill addition agent, for the manufacture of silicious vitreous enamel slips, comprising sodium carboxymethyl cellulose and at least one lithium salt selected from the group consisting of lithium titanate, lithium manganite, lithium silicate, lithium zirconate, lithium zirconium silicate, lithium aluminate, and lithium cobaltite, said lithium salt being present in proportions approximately 2 to 4 times that of the sodium carboxymethyl cellulose.

2. A mill addition agent, for the manufacture of silicious vitreous enamel slips, comprising sodium carboxymethyl cellulose and lithium zirconium silicate, the lithium zirconium silicate being present in proportions approximately 2 to 4 times that of the sodium carboxymethyl cellulose.

3. A mill addition agent, for the manufacture of silicious vitreous enamel slips, comprising sodium carboxymethyl cellulose and lithium titanate, the lithium titanate being present in proportions approximately 2 to 4 times that of the sodium carboxymethyl cellulose.

4. A mill addition agent, for the manufacture of silicious vitreous enamel slips, comprising an alkali metal carboxy lower alkyl cellulose and at least one lithium salt selected from the group consisting of lithium titanate, lithium maganite, lithium silicate, lithium zirconate, lithium zirconium silicate, lithium aluminate, and lithium cobaltite, said lithium salt being present in proportions approximately 2 to 4 times that of said carboxyalkyl cellulose.

5. A mill addition agent, for the manufacture of silicious vitreous enamel slips, comprising an alkali metal carboxy lower alkyl cellulose and lithium zirconium silicate, the lithium zirconium silicate being present in proportions approximately 2 to 4 times that of said carboxyalkyl cellulose.

6. A mill addition agent, for the manufacture of silicious vitreous enamel slips, comprising an alkali metal carboxy lower alkyl cellulose and lithium titanate, the lithium titanate being present in proportions approximately 2 to 4 times that of said carboxyalkyl cellulose.

WALTER M. FENTON.

References Cited in the file of this patent

UNITED STATES PATENTS

| Number | Name | Date |
|---|---|---|
| 1,343,468 | Nielsen et al. | June 15, 1920 |
| 1,502,422 | Cooper | July 22, 1924 |
| 1,789,311 | Kinzie | Jan. 20, 1931 |
| 1,891,210 | Wolfe | Dec. 13, 1932 |
| 2,013,856 | Kinzie | Sept. 10, 1935 |
| 2,190,210 | Kaber | Feb. 13, 1940 |
| 2,273,871 | Kinzie | Feb. 24, 1942 |
| 2,273,872 | Kinzie | Feb. 24, 1942 |
| 2,318,803 | Schneider | May 11, 1943 |
| 2,350,161 | Gloor | May 30, 1944 |
| 2,441,447 | Sebright | May 11, 1948 |
| 2,455,123 | Hurd | Nov. 30, 1948 |

FOREIGN PATENTS

| Number | Country | Date |
|---|---|---|
| 377,486 | Great Britain | July 28, 1932 |

---

[4] The frit was made from the following ingredients in parts by weight: Borax 370, feldspar 480, quartz 640, soda ash 190, fluorspar 90, sodium nitrate 80 and nickel oxide 8.

[5] The frit was made from the following ingredients in parts by weight: Borax 450, feldspar 460, quartz 620, soda ash 230, sodium nitrate 125, fluorspar 120 and nickel oxide 4.